United States Patent
Panteleev et al.

(10) Patent No.: US 11,601,789 B2
(45) Date of Patent: Mar. 7, 2023

(54) UE CONFIGURED TO DETERMINE SLOTS AND RESOURCE BLOCKS FOR V2X SIDELINK COMMUNICATION BASED ON SCI FORMAT

(71) Applicant: Intel Corporation, Santa Clara, CA (US)

(72) Inventors: Sergey Panteleev, Nizhny Novgorod (NZ); Alexey Khoryaev, Nizhny Novgorod (NZ); Mikhail Shilov, Nizhny Novgorod (NZ)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 17/253,047

(22) PCT Filed: Aug. 1, 2019

(86) PCT No.: PCT/US2019/044664
§ 371 (c)(1),
(2) Date: Dec. 16, 2020

(87) PCT Pub. No.: WO2020/028662
PCT Pub. Date: Feb. 6, 2020

(65) Prior Publication Data
US 2021/0306828 A1 Sep. 30, 2021

Related U.S. Application Data

(60) Provisional application No. 62/713,387, filed on Aug. 1, 2018.

(51) Int. Cl.
H04W 4/46 (2018.01)
H04W 4/06 (2009.01)
(Continued)

(52) U.S. Cl.
CPC ............... *H04W 4/46* (2018.02); *H04W 4/06* (2013.01); *H04W 72/02* (2013.01);
(Continued)

(58) Field of Classification Search
CPC ......... H04W 4/46; H04W 4/06; H04W 72/02; H04W 72/0446; H04W 72/1263;
(Continued)

(56) References Cited

U.S. PATENT DOCUMENTS

2017/0353819 A1* 12/2017 Yin .................... H04W 72/1284
2018/0139724 A1    5/2018 Loehr et al.
2020/0328852 A1* 10/2020 Tang .................... H04W 80/02

OTHER PUBLICATIONS

"Considerations on Support of Short TTI for LTE V2V Side link Communication", R1-1707307, 3GPP TSG RAN WG1 Meeting #89, Hangzhou, P.R. China, (May 7, 2017).
(Continued)

*Primary Examiner* — Sharmin Chowdhury
(74) *Attorney, Agent, or Firm* — Schwegman Lundberg & Woessner, P.A.

(57) ABSTRACT

Systems and methods of providing NR V2V communications are disclosed. Channel sensing is used by both UEs to determine sets of candidate resources, and subsequently select a resource, for PSCCH and PSSCH transmissions. The transmitting UE selects the PSCCH resource and transmits a scheduling request using the PSCCH resource, while the receiving UE selects a PSCCH and the PSSCH resource and transmits a scheduling grant in the PSCCH containing transmission parameters and the PSSCH resource to the transmitting UE. When the scheduling request contains the candidate resources for the PSCCH transmission, the receiving UE uses the intersection of the candidate resources for the PSCCH transmission and the candidate resources for transmission to determine the PSCCH and the PSSCH resource.

20 Claims, 5 Drawing Sheets

(51) Int. Cl.
  *H04W 72/02* (2009.01)
  *H04W 72/04* (2009.01)
  *H04W 72/12* (2009.01)
  *H04W 72/14* (2009.01)
  *H04W 72/0446* (2023.01)
  *H04W 72/1263* (2023.01)
(52) U.S. Cl.
  CPC ... *H04W 72/0446* (2013.01); *H04W 72/1263* (2013.01); *H04W 72/14* (2013.01)
(58) Field of Classification Search
  CPC ... H04W 72/14; H04W 72/005; H04W 72/10; H04W 74/0808; H04W 4/023; H04W 92/18
  See application file for complete search history.

(56) References Cited

OTHER PUBLICATIONS

"Discussion on PC5 carrier aggregation", R2-1708509, 3GPP TSG-RAN WG2 Meeting #99, Berlin, Germany, (Aug. 11, 2017).
"International Application Serial No. PCT/US2019/044664, International Search Report dated Nov. 18, 2019", 3 pgs.
"international Application Serial No. PCT/US2019/044664, Written Opinion dated Nov. 18, 2019", 4 pgs.
"International Application Serial No. PCT/US2019/044664, International Preliminary Report on Patentability dated Feb. 11, 2021", 6 pgs.

\* cited by examiner

UE CONFIGURED TO DETERMINE SLOTS AND RESOURCE BLOCKS FOR V2X SIDELINK COMMUNICATION BASED ON SCI FORMAT

This application is a U.S. National Stage Filing under 35 U.S.C. 371 from international Application No. PCT/US2019/044664, filed Aug. 1, 2019 and published in English as WO 2020/028662 on Feb. 6, 2020, which claims the benefit of the benefit of priority to U.S. Provisional Patent Application Ser. No. 62/713,387, filed Aug. 1, 2018, each of which is incorporated herein by reference in its entirety.

TECHNICAL FIELD

Embodiments pertain to radio access networks. Some embodiments relate to vehicle-to-everything (V2X) communications in various radio access technologies (RATs) including cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, as well as the burgeoning V2X communications, has severely strained network resources and increased communication complexity. V2X communications of a variety of different applications from a UE are to coordinate with various technologies, as well as among potentially rapidly moving vehicles. This may be particularly relevant to future generations of UEs, which may be able to communicate using various technologies. The introduction of both unicast and broadcast operation in the same spectrum affects the coexistence of both communication types, which may appreciably impact V2X communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
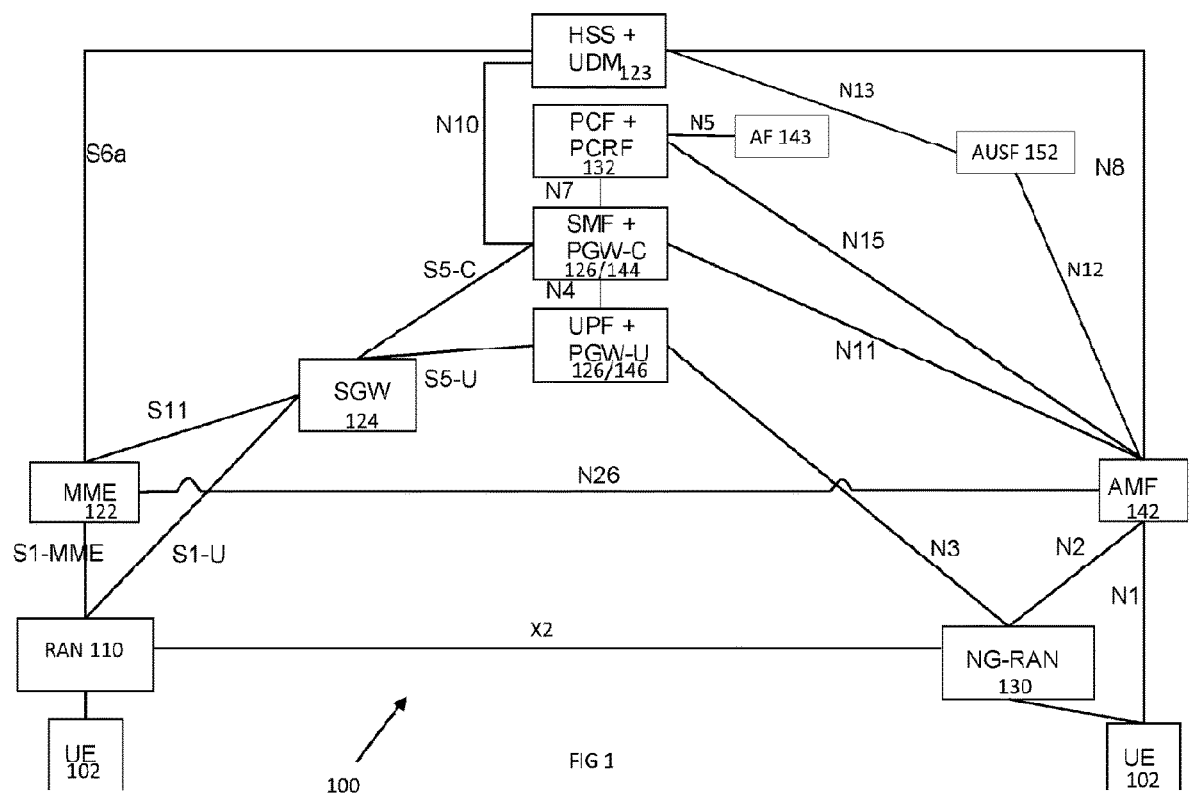
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
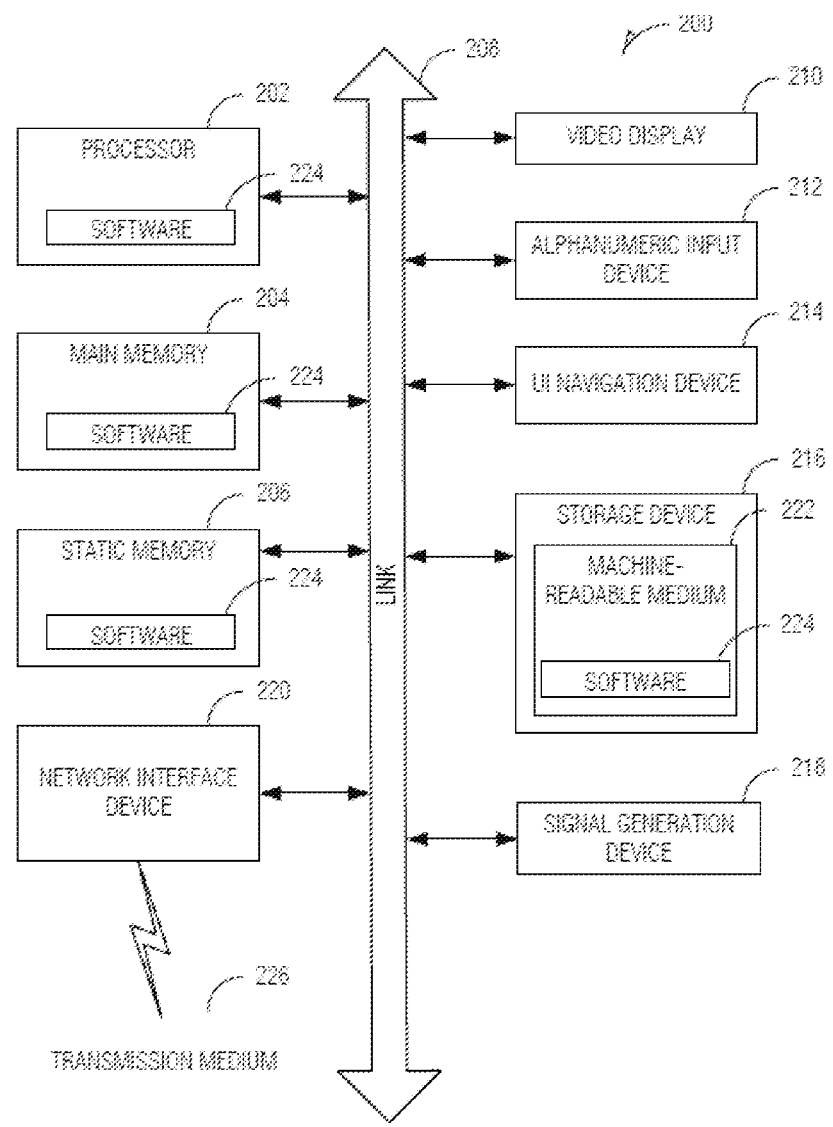
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances used in V2X communications.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device such as a vehicle device, any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, UEs may engage in unidirectional or bidirectional V2X communications. V2X communications may be part of a next generation Intelligent Transportation System (ITS) that is to be designed to take into account the massive influx of low-data, high-delay and low power transmissions. There may be multiple radio access technologies (RAT) available for communications by V2X UEs. V2X UEs (also called on-board units or OBUs) may be equipped with a range of multiple access technologies for V2X communications, using protocols such as Dedicated Short Range Communication (DSRC), LTE, and 5G (also called new radio (NR)), each of which may be direct or network-mediated communication between OBUs. The DSRC suite of protocols is based on the IEEE 802.11 standards, adding modifications to the exchange of safety messages between vehicles and vehicles and road side units (RSUs).

The types of communications in the ITS may include Vehicle-to-Vehicle (V2V) communications, Vehicle-to-Infrastructure (V2I) communications, Vehicle-to-Network (V2N) communications and Vehicle-to-Pedestrian (V2P) communications. The communications may occur over a PC5 reference point. V2X applications in the V2X UEs may communicate with other vehicle-based V2X applications (V2V communications), V2I communications may involve communications with a RSU and V2N communications may involve communications with an eNB (or E-UTRAN) to provide various V2X services. The communications among OBUs may be coordinated by a traffic management server.

ITS applications may rely on the concept of situation or co-operative awareness, which is based on periodic and event-driven broadcast of basic safety messages (BSM) for V2V, V2I and V2P transmissions. Such transmissions may thus be based on primarily broadcast capability between vehicles or between vehicles and vulnerable road users (e.g., pedestrian, cyclist). The transmissions may, for example, provide information about location, velocity and direction, which may be used to avoid accidents. The short messages (BSM) may be useful locally to identify situations that require action (e.g. collision warning, emergency stop, pre-crash warning, etc.) within very short intervals (e.g. 20 to 100 msec). As such, minimizing the overhead involved in enabling scalable transmission and reception of BSMs is one of the challenges to support V2X (V2V, V2I and V2P) over cellular systems. Broadcasts, however, are not the only transmissions between the OBUs; unicast messages may also be communicated between the various OBUs.

V2I transmission may be provided between a vehicle and UE (RSU). V2N transmission may be between a vehicle and a V2X application server. A V2X Application Server may be able to support multiple V2X applications. A RSU may be used to extend the range of a V2X message received from a vehicle by acting as a forwarding node (e.g., repeater). V2I may include communication between vehicles and traffic control devices, such as in the vicinity of road work. V2N may also include communication between vehicle and the server via the 4G/5G network, such as for traffic operations. Thus, an RSU may support V2I service that can transmit to, and receive from, a UE using V2I applications. In various embodiments, the RSU may be implemented in an eNB or a stationary UE. The RSU may rebroadcast V2X messages for other vehicles (V2V), pedestrians (V2P), or various networks systems (V2I) using a multimedia broadcast multicast service (MBMS) for LTE.

It is expected that NR V2X communication systems will support a wide variety of use cases and deployment scenarios including basic safety message exchange, advanced driving applications, and extended sensor sharing. While basic safety applications may largely reuse the channel access LTE design that is based on sensing performed at the transmitter side, advanced applications may involve channel access schemes based on a combination of transmitter and receiver-based sensing to achieve higher data rates and reliability. Note that such new use cases mainly assume groupcast or unicast type of sidelink communication wherein the knowledge of intended message recipients may help in adapting transmitter and receiver behavior to select optimal resources in terms of system capacity and link performance.

In broadcast systems, however, at present there is no accurate characterization of intended receivers and respective propagation channels. This leads to the only approach for collision avoidance, which is transmitter-based channel sensing for resource selection introduced and supported in LTE Rel.14/15 V2V communication. Such an approach does not directly ensure receiver channel quality due to multiple challenges, such as hidden node interference, in-band emission, and near-far problems.

The transmitter-based channel sensing scheme, if directly applied for unicast and groupcast operation targeted to be supported by NR V2X, would substantially limit the achievable link reliability and spectrum efficiency due to the same problems of hidden node interference, in-band emissions, and near-far effects. The intended receiver/group of receivers for unicast and groupcast may be assumed to be known due to pre-association, authorization, discovery procedures at least from higher layer perspective. Therefore, such types of links may employ a more advanced collision avoidance scheme based on a combination of transmitter- and receiver-based sensing.

Introduction of unicast links together with broadcast operation in the same spectrum may use considerations on seamless co-existence of both communication types. Therefore, at least introduction of unicast links into a broadcast system should not substantially degrade the performance of the broadcast system and/or performance of the unicast system in case of the mix with the broadcast system should not substantially degrade comparing to the unicast-only scenario. In order to ensure such co-existence, the distributed communication mode may be designed to take into account different types of links and may employ a unified channel sensing approach and control signaling design.

Although listen-before-talk (LBT) procedures provide improved performance in low and medium loading conditions, the use of LBT may degrade dramatically in medium-to-high and high loadings. Adopting a synchronous communication system with a combination of long-term and short-term sensing procedures and taking into account traffic patterns may provide substantially better performance compared to short-term LBT-based systems.

However, to date 3GPP has not considered mix of scenarios (broadcast and unicast/groupcast) and therefore no support exists at the physical layer targeting to optimize unicast and groupcast type of operation. The basic design assumption was that physical layer is purely broadcast while any unicast/groupcast is deployed at higher layers. Such an assumption is not suitable for scenarios targeted in NR V2X where the data rates, latency, and reliability requirements are much stricter compared to LTE V2V.

Regardless of particular channel access approaches, the support of different communication types may be classified by different sequences of control and shared channel transmission. The following Distributed Scheduling Modes (DSM) may be introduced:

DSM Category-1: This category of distributed scheduling modes assumes the scheduling assignment (SA) or sidelink control information (SCI) and data (or sidelink data) are transmitted either in the same time instance or consequently without any event or a trigger or a response from a receiving side between the SA and data transmission. Such a scheduling approach may be similar to downlink (DL) broadcast operation in cellular systems. This approach was also used for distributed scheduling modes for Rel. 12-13 device-to-device and Rel. 14-15 V2V communication introduced in LTE.

Figure 3:
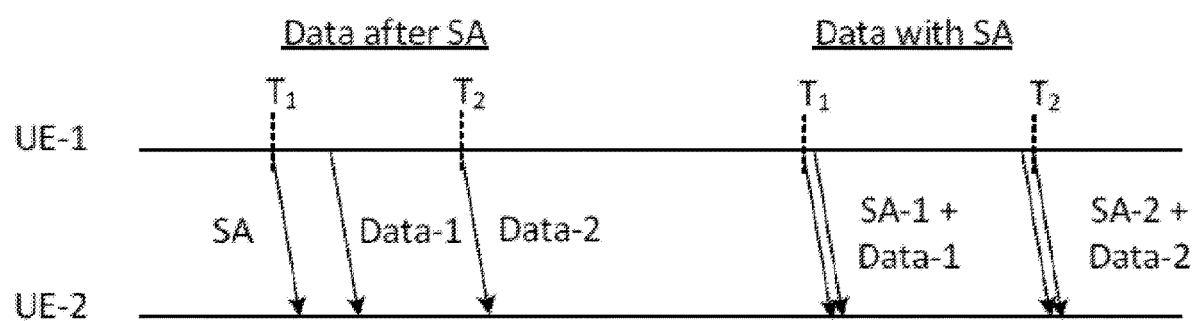
FIG. 3 illustrates a Distributed Scheduling Mode category 1 in accordance with some embodiments.

FIG. 3 illustrates a Distributed Scheduling Mode category 1 in accordance with some embodiments. As illustrated in FIG. 3, there may be multiple variants or configurations with respect to the timing relationship between SA and data transmissions. These include that the data transmission follows after the SA transmission, or that the data transmission occurs together with the SA transmission. In addition, the number of data and SA transmissions, as well as other features of the transmissions may vary. It should be noted that instead of SA notation, the SCI or physical sidelink control channel (PSCCH) can be used, while data can be represented by sidelink shared channel transmission (SCH) or physical sidelink shared channel (PSSCH). Note that a feedback channel is not shown in FIG. 3 for convenience (i.e., ACK/NACK feedback for HARQ processes in response to each transmission, although present, are not shown).

Figure 4:
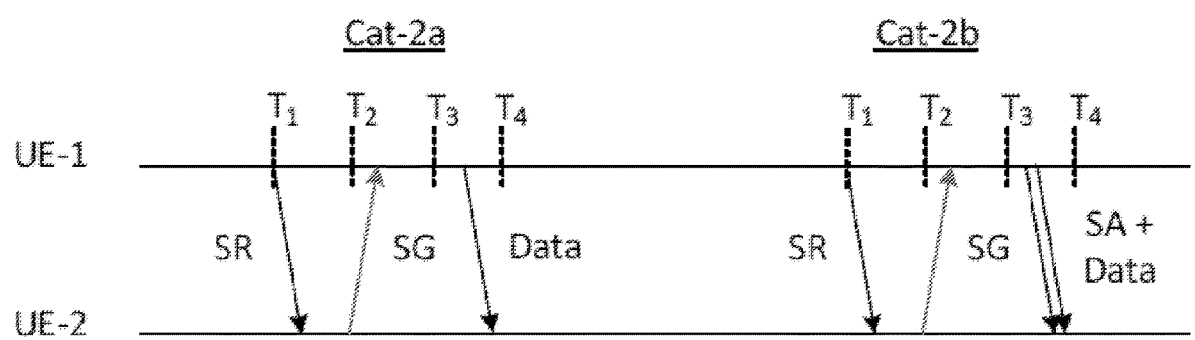
FIG. 4 illustrates a Distributed Scheduling Mode category 2a and 2b in accordance with some embodiments.

DSM Category-2a (scheduling grant is provided by the receiver): This category of distributed scheduling modes exploits a three-step approach. FIG. 4 illustrates a Distributed Scheduling Mode category 2a and 2b in accordance with some embodiments. Note that the times T1-T4 may be dependent on the latency of V2V communications between UE-1 and UE-2 (e.g., 50-100 ms or more) and processing time at the receiver (e.g., several ms), for example, and may be configured by the network. As illustrated in the left side of FIG. 4, the data transmission may be initiated by the first UE (UE-1) sending a scheduling request (SR) control message at time T1. The SR may also include other control information such as identification of UE-1 and/or UE-2, the buffer state of UE-1, and resource allocation information, among others. In response to a successfully detected SR, the second UE (UE-2) (the intended receiver) may between time T2 and time T3 send a scheduling grant (SG) indicating at least transmission parameters for a V2V data transmission. The transmission parameters may include allocated resources for transmission. The first UE, having received the SG, may then send a V2V data transmission between time T2 and time T3. The V2V data transmission may follow the transmission parameters from the SG. This mode enables optimization of TX resources from RX perspective. The SR may indicate intended resources for data TX, which the SG may either overwrite or confirm. The SR may also indicate resources for the SG itself, which may be considered optimal from TX perspective.

DSM Category-2b: This category is similar to DSM-Cat-2a and is again shown in FIG. 4. This category of distributed scheduling modes exploits a similar three-step approach as category 2a. In particular, the data transmission may be initiated by the first UE sending a SR control message at time T1. As above, the SR may also include other control information. In response to a successfully detected SR, the second UE may between time T2 and time T3 send a SG indicating at least transmission parameters for a data transmission by the first UE. The UE, having received the SG, may transmit the SA together with data between time T3 and time T4. The SA and data transmissions may follow the SG transmission parameters may use new parameters, which may be indicated in the SA. As in DSM-Cat-2a, the SR may indicate intended resources for the data transmission, which may be confirmed or overwritten by the SG transmission. The SR may also indicate a resource for the SG transmission itself, which may be optimal from a transmitter perspective. The SG may provide recommended resources for the SA and data transmission, which may or may not be used by the transmitter.

In some embodiments, the type of DSM-Cat used may depend on the type of link. Thus, for example, distributed broadcast links may use scheduling procedures defined for DSM-Cat-1 and unicast/groupcast links may use scheduling procedures defined for DSM-Cat-2. In this case, a UE initiating transmission of a broadcast packet may apply procedures related to DSM-Cat-1, while a UE initiating transmission of a unicast or a groupcast packet may apply procedures related to DSM-Cat-2. Similarly, a UE monitoring for broadcast packets may follow the procedures of DSM-Cat-1, while a UE monitoring for unicast or groupcast packets may follow the procedures of DSM-Cat-2.

Further, in some embodiments, the SA, SR, and SG transmissions may be transmitted in a PSCCH as a SCI format. For example, the SA, SR, and SG transmissions may correspond to SCI formats 0_0, 1_0, and 2_0 respectively if the transmissions have different sizes and/or are monitored in different resource sets. Alternatively, the control information types may be carried by a single SCI format (e.g. 0_0) with a header field indicating the type of control information. For current example, a 2-bit header field may be employed for this purpose.

In some embodiments, a basic step of channel access procedure may be defined based on identification of a set of least congested PSCCH and PSSCH resources for a given priority of transmission. The set of least congested resources may be identified based on multi-step channel sensing procedures that may depend on multiple higher layer configured parameters, traffic/service types, traffic/service priorities, congestion control functions, etc. The channel sensing procedure defined for LTE V2V communication (sensing channel occupation) may be reused as a baseline for identification of the set of least congested resources. The set of least congested candidate resources identified after the sensing procedure at the first UE may be denoted as $R_1$. The channel sensing procedure may include periodic and/or persistent sensing.

In some embodiments, a UE operating in DSM-Cat-1 may randomly select a resource (time and frequency) for transmission of the SA in the PSCCH and the data in the PSSCH from the resource set $R_1$. The resource allocation granularity may be, for example, 1 ms and 15 kHz a smallest entity that can be allocated is one resource block pair. As above, the set $R_1$ may be determined using channel sensing procedures. In other embodiments, other selection techniques rather than random selection may be used in this operation (as well as selection of other resource sets as described herein). For example, resource selection may exclude predetermined resources among the least congested candidate resources, may take into account priority information of the UE or data, or may use collision avoidance.

Figure 5:
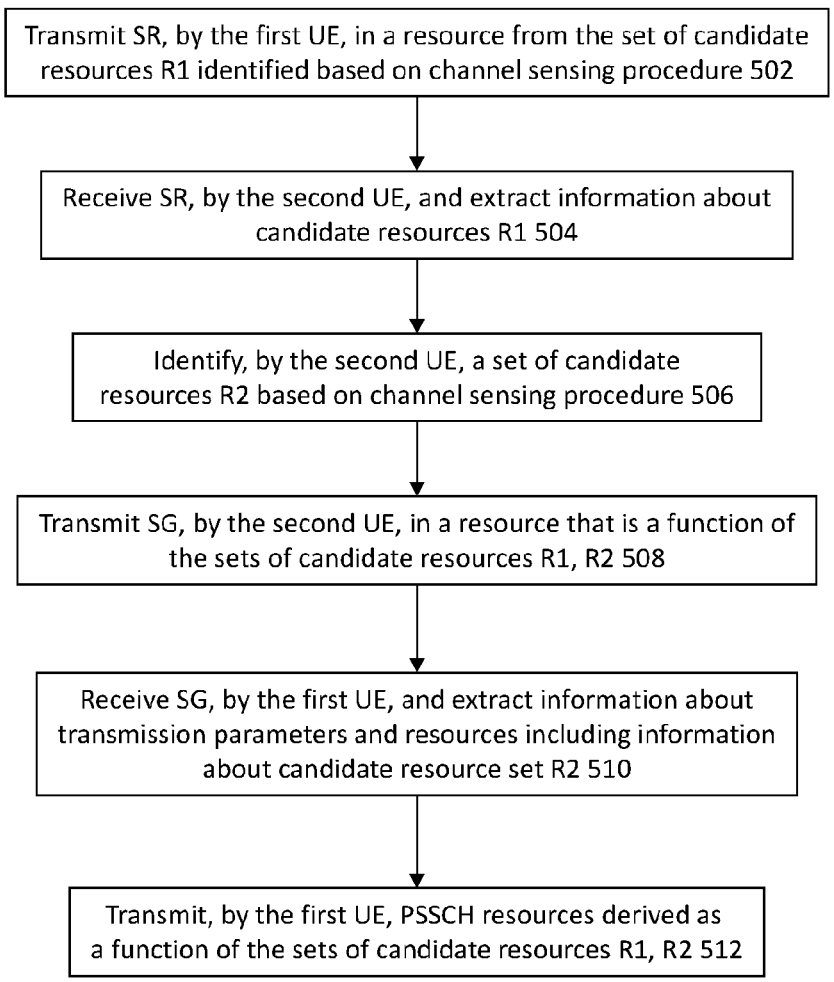
FIG. 5 illustrates operations of distributed scheduling mode category 2a in accordance with some embodiments.

Similarly, in some embodiments, UEs operating in DSM-Cat-2, may follow a three step scheduling procedure. FIG. 5 illustrates operations of distributed scheduling mode category 2a in accordance with some embodiments. Step 1: a first UE operating in DSM-Cat-2 may perform a basic step of channel access procedure to identify candidate resources $R_1$ for transmission of the SR in the PSCCH. The first UE may then randomly select a PSCCH resource for SR transmission from the candidate resource set $R_1$ and transmit the SR in a period between time instances $T_1$ and $T_2$ as shown at operation 502. As an option, the SR may also convey information about candidate resource set $R_1$ in order to assist in further steps of resource selection.

Step 2: a second UE may detect the SR from the first UE at operation 504. The SR may be detected by decoding the PSCCH and validating that the SR is intended for the second UE.

Once the SR is detected, the second UE may select a PSCCH resource for SG transmission from a candidate resource set $R_2$. The set $R_2$ may be obtained at operation 506 by the second UE performing the same basic channel sensing procedure undertaken by the first UE as for determination of set $R_1$. If information about the set $R_1$ is provided in the SR, the second UE may select PSCCH resources for SG transmission as a function of both sets $R_1$ and $R_2$. Such a function may be based on intersection of these sets, i.e., $R_1 \cap R_2$. However, if the intersection is empty, other functions based on either $R_1$ or $R_2$ may be applied, for example only $R_1$ or only $R_2$ may be used. Alternatively, transmission of the SG may be skipped altogether.

The SG may be transmitted at operation 508 by the second UE in a period between time instances $T_2$ and $T_3$. The SG may at least convey information about transmission parameters and resources for the first UE. As an option, the SG may also convey the candidate set $R_2$ or an intersection of sets, i.e. $R_1 \cap R_2$.

Step 3: the first UE may detect the SG and validate that the SG is intended for the first UE at operation 510. Once the SG is detected, the first UE may use the indicated transmission parameters and physical resources for transmission of data in the PSSCH to the second UE at operation 512. For Cat-2a operation, the data in the PSSCH may be transmitted using the exact resources and transmission parameters indicated in the SR+SG so that (re)transmission of control information may be avoided. In some cases, however, it may be useful to transmit the SA together with the data, i.e. follow Cat-2b, to preserve basic channel procedures performed by UEs operating in DSM Cat-1 or to indicate particular resources and transmission parameters for the PSSCH.

UE behavior when missing SR/SG/SA/PSSCH

In the above described procedure, the UE behavior when missing one of the involved channels should be defined, in addition to the actions upon successful reception. To this end, if an SR is not detected at the intended receiver, the intended receiver cannot respond with a grant and therefore such situation should be handled at the transmitter side as discontinuous transmission detection (DTX). In that case, all related behavior is in the category of a missed SG.

For a missed SG, an SG that is not detected at the TX side of the link may either be caused by SR failure or SG failure. Therefore, in such a case, the TX side may handle DTX by repeating the SR transmission in another occasion of the $T_1$-$T_2$ window. The repeated SR may be sent with transmission parameters and/or resources so that the reliability of SR and SG is improved compared to the failed attempt. In one embodiment, the resource selection procedure for SR and/or SG resources may be adjusted to select less congested PSCCH resources by changing selection characteristics such as Reference Signal Receive Power (RSRP) thresholds, Received Signal Strength Indicator (RSSI) thresholds, transmission priority, number of occupied resources, if possible, etc. In another embodiment, the UE may fallback to DSM Category 1 and directly transmit the SA+Data (e.g., if SG is missed and latency budget is limited). NEXT WINDOW, number of repetitions, power, resources; least congested resources; fallback to cat 1 procedure For a missed SA (assuming the SR was successfully decoded and the receiving UE responded with an SG) and/or PSSCH, the receiving UE may indicate that the receiving UE missed the planned SA+PSSCH transmission. This may be done by sending the SG in another occasion of the $T_2$-$T_3$ window and setting a new data indicator (NDI) to '0', e.g., implicitly indicate a negative acknowledgement (NACK) and allocate another set of resources and transmission parameters.

Control Signaling Design to Support DSM-Cat 2

The PSCCH candidate resource set may be identified using different procedures depending on the SCI format to be transmitted. If the SCI format carries the SR, the PSCCH candidate resources may be selected without any linkage to the PSSCH to be transmitted. This may be unlike resource selection for the SA, which may be performed jointly with the PSSCH.

Additionally, the candidate PSCCH set for the SR may take into account previous resource selection decisions if desired. This is to say that the candidate PSCCH set for the SR may use prior information about successful SR resource selection or use resources negotiated during initial connection between the UEs in a pair or a group, e.g. use reserved resources.

If the SCI format carries the SG, the PSCCH candidate resources, as described in DSM-Cat 2, may be a function of the PSCCH candidate resource set at the transmitting UE, i.e. $R_1$, and the PSCCH candidate resource set at receiving UE, i.e. $R_2$. The candidate set $R_1$ and $R_2$ may be split between control and shared channels on the following sub-sets:

$R_1^{PSCCH}$, $R_2^{PSCCH}$—candidate resources for PSCCH transmission carrying the SR or SG $R_1^{PSSCH}$, $R_2^{PSSCH}$—candidate resources for PSSCH and PSCCH (SA, if applicable) transmission Further, each of the candidate resource sets or sub-sets may be signaled in the SR and/or SG in a compact manner using one of the following approaches of candidate resource set indication (CRSI):

CRSI Option 1 may use a bitmap approach over sub-channels and transmission time intervals (TTIs) in a resource selection window in a frequency-first time-second manner. For example, having N frequency sub-channels and M TTIs in the resource selection window, the bitmap may be of size N×M bit. In such a bitmap, '1' may indicate that the corresponding time-frequency resource is considered least congested, while '0' may indicate that the resource is not available. The described CRSI may be a function of sidelink transmission priority and be indicated per each priority in a set.

CRSI Option 2 may use a plurality of time-frequency resources in the form of multiple independent resource allocation fields. Each resource allocation field may describe a single time-frequency resource. The size of frequency allocation may be indicated once and a set of time and frequency offsets relative to a reference point may be indicated as a set.

In some embodiments, the CRSI indication may signal the best sidelink resource for transmission from the receiver perspective (i.e., recommend the best resource for transmission).

Based on the procedures for DSM Cat-2 described above, the content of the SR/SG/SA with respect to channel access procedures are provided below. The SR may carry limited information. In some embodiments, the SR may be merely a 1-bit transmission that indicates whether there is any data for transmission. However, to assist in better resource selection, as discussed above, the SR may also include information to convey time-frequency resources of candidate sets $R_1$, $R_1^{PSCCH}$, $R_1^{PSSCH}$ as a bit-field in SCI according to the CRSI option 1 or option 2.

The SR may also convey additional information. The SR may, for example, include an SCI Format indicator to differentiate various types of SCI Formats (e.g. Scheduling Request, Scheduling Grant, Resource Reservation, etc.). The SR may also include power control-related parameters.

The SR may also include a buffer status report (BSR) or traffic pattern profile. This information may be used by the receiving UE to estimate the resource needs and transmission parameters to grant resources in the SG.

In addition, the SR may contain the priority of the pending traffic. The priority also may be a ProSe Per-Packet Priority (PPPP) or any sidelink transmission priority level derived based on PPPP. The priority may also be used by the receiving UE to decide the candidate resource set $R_2$ and/or be used by other UEs to take into account in channel access procedures, e.g., apply priority-specific RSRP, RSSI thresholds for resource selection and exclusion.

The SR may also include a reliability indicator of the pending traffic. The reliability indicator may be a ProSe Per Packet Reliability (PPPR) or any sidelink reliability indicator derived based on PPPR.

The SR may also include identification information such as link or group or UE identity. The identification information may either explicitly signaled or implicitly included as a scrambling sequence for at least a part of CRC of the SCI format carrying the SR.

The SR may also include resource reservation information—e.g. periodicity of the requested resources and/or reservation time. This may also be a part of BSR field as this information relates to traffic characteristics.

The SG may carry information such as an SCI Format indicator. As above, the SCI Format indicator may allow differentiation between the various types of SCI Formats (e.g. Scheduling Request, Scheduling Grant, Resource Reservation, etc.).

The SG may also carry resource allocation information, which may differ dependent on whether DSM-Cat-2$a$ or DSM-Cat-2$b$ is being used. For DSM-Cat-2$a$, the SG may carry the exact time-frequency resource allocation for a granted PSSCH transmission. The time-frequency resource allocation may include both the number of occupied sub-channels in frequency and the frequency starting position. The number of occupied sub-channels in frequency and the frequency starting position may be jointly encoded. The time-frequency resource allocation may also include TTI or slot allocation that may comprise an offset relative to the SG. The offset may be expressed in symbols/slots/TTIs. The time-frequency resource allocation may further include a pattern over TTIs in a transmission window or any other form of signaling to indicate a plurality of TTIs in a transmission window and frequency positioning of the TTIs relative to the first TTI or any other form of signaling to indicate different TTIs.

For DSM-Cat-2$b$, the SG may carry Candidate resource sets $R_2$, $R_2^{PSCCH}$, $R_2^{PSSCH}$ including candidate resources for the SA and the PSSCH transmission. The signaling may follow either Option 1 or Option 2 of candidate resource set indication options.

A number of different fields may be present in the SG (and/or SA), depending on the scheduling mode. These fields may include the Modulation and Coding Scheme (MCS), transport block size (TBS)-related parameters, sidelink transmission mode related parameters, demodulation reference signal (DMRS) parameters, power control-related parameters, an NDI (which may implicitly indicate whether or not a previous transmission attempt was successful), and a hybrid automatic repeat request (HARM) process ID.

The SA content, which may be valid for DSM-Cat-2$b$, may contain, as above, an SCI Format indicator. The SA may also include PSSCH resource allocation parameters as described in resource allocation field of SG for DSM-Cat-2$a$. The SA may further include a resource reservation indication and Sidelink Transmission Priority.

Distributed Scheduling Mode Adaptation

Having a defined set of distributed scheduling modes, a UE may follow either the configured mode by higher layers or may select the communication mode as a function of activated services, traffic characteristics (e.g. latency), radio-layer measurements etc. In some embodiments, the UE may estimate whether the UE is in proximity of the other UE in the pair. If both UEs consider each other in proximity, the UEs may employ DSM-Cat-1 instead of DSM-Cat-2 because of sets $R_1$ and $R_2$ may be highly correlated. The validation of the proximity may be done by at least one or a combination of: a determination that a measured RSRP (e.g., of a reference signal) is above a configured RSRP threshold at both UE1 and UE2; an estimated distance between UE1 and UE2 is below a configured distance threshold at both UE1 and UE2; and candidate resource sets $R_1$ and $R_2$ have substantial overlap, e.g. 90-95% or a configured fraction X. This information (e.g., RSRP, coordinates of each UE) may be exchanged between UE1 and UE2 or time stamps of the SA and/or SG may be used to determine that the time is less than a configured time difference.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus for a user equipment (UE) configured for vehicle-to-everything (V2X) sidelink communications in a fifth-generation (5G) system (5GS), the apparatus comprising: processing circuitry; and memory, the processing circuitry configured to:
   decode sidelink control information (SCI) received from another UE, the SCI comprising a first SCI format,
   the first SCI format indicating whether inter-UE coordination information is being provided or is being requested,
   wherein when the first SCI format indicates that inter-UE coordination information is being provided, the processing circuitry is configured to determine a set of resources for a physical sidelink shared channel (PSSCH) transmission by the UE based on a reference slot indicated by the first SCI format,
   wherein when the first SCI format indicates that inter-UE coordination information is being requested, the processing circuitry is configured to:
   determine a set of resources for a PSSCH transmission by the other UE based on a resource selection window, the resource selection window determined from information in the first SCI format;
   encode a second SCI format for transmission to the other UE in response to the first SCI format when the first SCI format indicated that inter-UE coordination information is being requested, the second SCI format encoded to provide the requested inter-UE coordination information including the set of resources determined for a PSSCH transmission by the other UE; and
   decode the PSSCH transmission from the other UE, the PSSCH transmission comprising data,
   wherein the memory is configured to store an indication of the set of resources.

2. The apparatus of claim 1, wherein to determine the set of resources for the PSSCH transmission by the other UE based on the resource selection window, the processing circuitry is to configure the UE to select one or more resources from within the resource selection window based on a measured Reference Signal Receive Power (RSRP) of the first SCI format.

3. The apparatus of claim 2, wherein for reception of the PSSCH transmission from the other UE, the processing circuitry is configured to encode a sidelink grant (SG) for transmission to the other UE.

4. The apparatus of claim 2, wherein for transmission of a PSSCH to the other UE, the processing circuitry is configured to encode a scheduling request (SR) for transmission to the other UE, the SR indicating the resources for the transmission of the PSSCH to the other UE.

5. The apparatus of claim 2, wherein the V2X sidelink communications comprise PSSCH communications directly between the UE and the other UE, without traversing a network node.

6. The apparatus of claim 2 wherein the processing circuitry is to configure the UE to perform channel sensing to determine availability of the set of resources.

7. The apparatus of claim 2, wherein the processing circuitry comprises a baseband processor.

8. The apparatus of claim 1, wherein the UE comprises one or more antennas.

9. A non-transitory computer-readable storage medium that stores instructions for execution by processing circuitry of a user equipment (UE) configured for vehicle-to-everything (V2X) sidelink communications in a fifth-generation (5G) system (5GS), the processing circuitry configured to:
   decode sidelink control information (SCI) received from another UE, the SCI comprising a first SCI format, the first SCI format indicating whether inter-UE coordination information is being provided or is being requested,
   wherein when the first SCI format indicates that inter-UE coordination information is being provided, the processing circuitry is configured to determine a set of resources for a physical sidelink shared channel (PSSCH) transmission by the UE based on a reference slot indicated by the first SCI format,
   wherein when the first SCI format indicates that inter-UE coordination information is being requested, the processing circuitry is configured to:
   determine a set of resources for a PSSCH transmission by the other UE based on a resource selection window, the resource selection window determined from information in the first SCI format;
   encode a second SCI format for transmission to the other UE in response to the first SCI format when the first SCI format indicated that inter-UE coordination information is being requested, the second SCI format encoded to provide the requested inter-UE coordination information including the set of resources determined for a PSSCH transmission by the other UE; and
   decode the PSSCH transmission from the other UE, the PSSCH transmission comprising data,
   wherein the memory is configured to store an indication of the set of resources.

10. The non-transitory computer-readable storage medium of claim 9, wherein to determine the set of resources for the PSSCH transmission by the other UE based on the resource selection window, the processing circuitry is to configure the UE to select one or more resources from within the resource selection window based on a measured Reference Signal Receive Power (RSRP) of the first SCI format.

11. The non-transitory computer-readable storage medium of claim 10, wherein for reception of the PSSCH transmission from the other UE, the processing circuitry is configured to encode a sidelink grant (SG) for transmission to the other UE.

12. The non-transitory computer-readable storage medium of claim 10, wherein for transmission of a PSSCH to the other UE, the processing circuitry is configured to encode a scheduling request (SR) for transmission to the other UE, the SR using the determined set of resources for the PSSCH transmission for by the UE.

13. The non-transitory computer-readable storage medium of claim 10, wherein the V2X sidelink communications comprise PSSCH communications directly between the UE and the other UE, without traversing a network node.

14. An apparatus for a user equipment (UE) configured for vehicle-to-everything (V2X) sidelink communications in a fifth-generation (5G) system (5GS), the apparatus comprising: processing circuitry; and memory, the processing circuitry configured to:
  encode sidelink control information (SCI) for transmission to another UE, the SCI comprising a first SCI format, the first SCI format indicating whether inter-UE coordination information is being provided or is being requested,
  wherein when the first SCI format indicates that inter-UE coordination information is being provided, the processing circuitry is configured to determine a set of resources for a physical sidelink shared channel (PSSCH) transmission by the other UE based on a reference slot indicated by the first SCI format,
  decode a second SCI format received from the other UE in response to the first SCI format when the first SCI format indicated that inter-UE coordination information is being requested, the second SCI format including the requested inter-UE coordination information including information for use by the UE to determine a set of resources for receipt of a PSSCH transmission by the other UE; and
  decode the PSSCH transmission from the other UE, the PSSCH transmission comprising data,
  wherein the memory is configured to store an indication of the set of resources.

15. The apparatus of claim 14, wherein to determine the set of resources for the PSSCH transmission based on the resource selection window, the processing circuitry is to configure the UE to select one or more resources from within the resource selection window based on a measured Reference Signal Receive Power (RSRP) of the first SCI format.

16. The apparatus of claim 15, wherein for reception of the PSSCH transmission, the processing circuitry is configured to encode a sidelink grant (SG) for transmission to the other UE.

17. The apparatus of claim 15, wherein for transmission of a PSSCH, the processing circuitry is configured to encode a scheduling request (SR) for transmission to the other UE, the SR indicating the resources for the transmission of the PSSCH to the other UE.

18. The apparatus of claim 15, wherein the V2X sidelink communications comprise PSSCH communications directly between the UE and the other UE, without traversing a network node.

19. The apparatus of claim 15, wherein the processing circuitry comprises a baseband processor.

20. The apparatus of claim 19, wherein the UE comprises one or more antennas.

* * * * *

UNITED STATES PATENT AND TRADEMARK OFFICE
CERTIFICATE OF CORRECTION

PATENT NO. : 11,601,789 B2
APPLICATION NO. : 17/253047
DATED : March 7, 2023
INVENTOR(S) : Panteleev et al.

It is certified that error appears in the above-identified patent and that said Letters Patent is hereby corrected as shown below:

On the Title Page

On page 2, in Column 1, under item (56), "Other Publications", Line 5, delete ""international" and insert --"International-- therefor Signed and Sealed this
Twenty-first Day of May, 2024

Katherine Kelly Vidal
*Director of the United States Patent and Trademark Office*